Aug. 8, 1967     D. M. PHILLIPS     3,334,431
DIGGER TOOTH CONSTRUCTION
Filed June 16, 1964
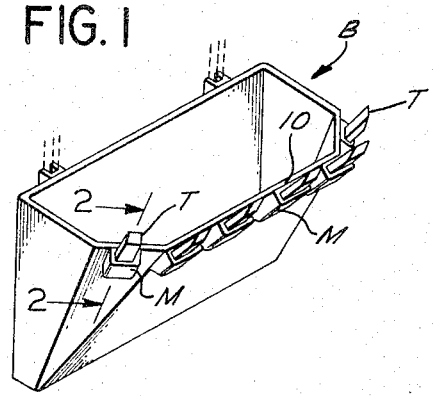
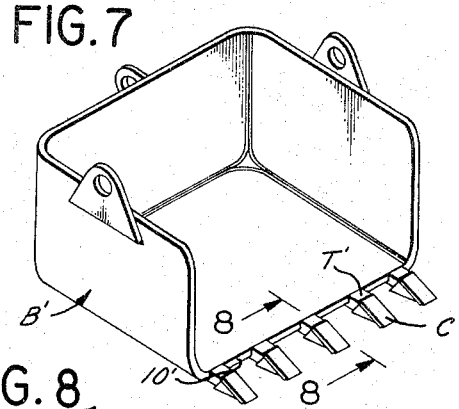
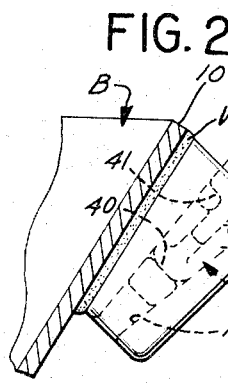
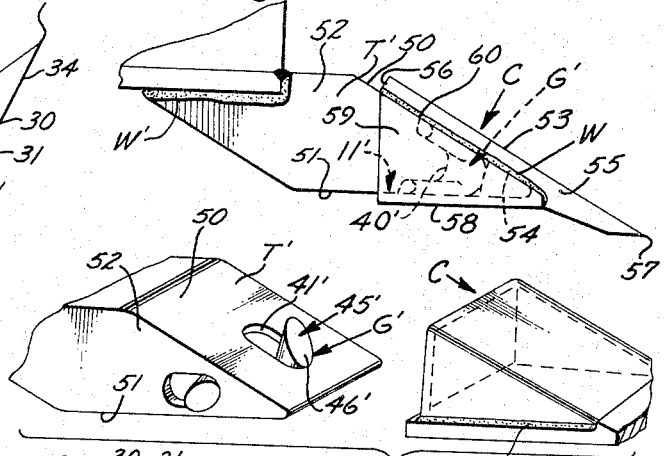
INVENTOR.
DWIGHT M. PHILLIPS
BY
AGENT United States Patent Office 3,334,431
Patented Aug. 8, 1967

3,334,431
DIGGER TOOTH CONSTRUCTION
Dwight M. Phillips, Placentia, Calif.
(14200 E. 6th St., Corona, Calif. 91720)
Filed June 16, 1964, Ser. No. 375,439
8 Claims. (Cl. 37—142)

This invention relates to a digger tooth and is more particularly concerned with improved means for securing digger teeth to earth moving equipment and the like, or for securing digger teeth caps to digger teeth on such equipment.

In the art of earth moving, it is common practice to provide the earth or work-engaging parts of the equipment used with teeth, to bite into the earth being worked upon and to receive the major portion of the wear to which the equipment is subjected.

The art of digger teeth has developed along two distinct lines. The first line of development is the provision of removable digger teeth that can be readily replaced when they become worn. The second line of development has been the provision of wear-receiving tooth caps adapted to be releasably engaged on digger teeth permanently affixed to the equipment. In each case, a substantially standard construction has been arrived at and accepted by the art.

The ordinary digger tooth, such as is used in trenching machines and other similar earth-moving equipment, includes an elongate forwardly-tapered, rectangular blade adapted to engage the work, that is, the earth being worked upon, and an elongate, rearwardly-convergent tapered mounting tang or wedge, rectangular in cross-section and engageable in a forwardly-opening, rearwardly-converging polygonal opening in an element on, or part of, the piece of equipment with which the tooth is related. The opening in which the wedge of the tooth is engaged is normally provided in a simple mounting block, fixed to the piece of equipment by welding, or the like. In the case of the ordinary digger tooth construction, such as is set forth above, the wedge of the tooth is driven into tight wedging engagement in the opening in the mounting block, as by striking the forward end of the tooth with a hammer.

The above manner of mounting such digger teeth is extremely undependable, since in the normal operation, and in the transportation of the equipment with which the teeth are related, the equipment and the teeth are subjected to considerable and severe shocks and/or vibrations which tend to break the snug or tight wedging fit of the teeth in the mounting blocks, with the result that the teeth become displaced and lost.

The smallest standard size of such teeth costs about $.50 each. Small, standard trenching machines on which such teeth are employed are ordinarily provided with well in excess of 100 of such teeth. Larger teeth are considerable more costly and the machines on which they are used employ a considerably greater number of teeth.

In light of the above, it will be apparent that the odds or chances of such teeth becoming displaced and lost is great and that the expense of such losses can be, and often is, considerable.

In an effort to overcome the above problem and to avoid displacement and loss of such digger teeth, the prior art has developed many special and unique means for locking or securing such teeth into their mounting blocks. Such means, however, have been complicated and costly to manufacture, and are such that application or installation to, and removal of the teeth from the equipment with which they are related is difficult and troublesome.

Due to the increased expense and inconvenience involved in connection with digger teeth provided with existing and commercially available locking means, most users of digger teeth have refused to employ such teeth and chance or risk the loss that can be anticipated in the use of simple, standard teeth, without special locking means.

The ordinary digger tooth cap such as is applied to permanently affixed earth-engaging teeth on power shovel buckets, scarifiers, and the like, includes an elongate, substantially flat, plate-like body having front and rear portions and a housing fixed to the rear portion and co-operating therewith to define a rearwardly-opening tooth-receiving socket having two opposite, forwardly-converging walls adapted to cooperatively engage and establish wedging engagement on similarly disposed surfaces on the tooth to which the cap is related.

Digger tooth caps, like removable digger teeth as above set forth, are subject to becoming loose and displaced from the teeth on which they are engaged and, as in the case of replaceable digger teeth, many special, complicated, costly and bothersome means have been provided to releasably lock or hold digger tooth caps in engagement on their related teeth.

It is to be noted that in both the common digger tooth and the common digger tooth cap constructions, a mounting means is provided which includes a tapered wedge-like part and a cooperating opening in which the wedge part is engaged. In the case of the removable digger tooth, the wedge part is on the rear end of the tooth and the opening to receive the wedge part is in a mounting lock fixed to the earth moving equipment, whereas, in the case of the digger tooth cap, the tooth establishes the wedge part, and the cap is provided with the wedge-receiving opening.

An object of the present invention is to provide a novel locking or gripping means for releasably holding a wedge in a wedge-viewing opening.

A further object of my invention is to provide a removable digger tooth with novel mounting means.

A further object of this invention is to provide a fixed digger tooth with a novel tooth cap gripping means.

It is an object of my invention to provide a gripping means including a simple block of rubber, and an opening in a wedge member to receive a portion of the rubber block, said rubber block serving to flow between and establish yielding gripping engagement between the wedge member and the walls of an opening in which the wedge is engaged.

An object of this invention is to provide a gripping means of the character referred to wherein the opening in the wedge member extends through the member on an axis substantially normal to the longitudinal axis of the member and wherein said rubber block projects from the opposite ends of the opening and the opposite sides of said member.

Still another object of this invention is to provide a gripping means of the character referred to wherein the wedge member is provided with recesses at the ends of the opening through which the rubber block projects to accommodate the portions of the rubber block caused to flow when the wedge member is urged into wedging engagement in a cooperating wedge-receiving opening.

Another object of the present invention is to provide a novel gripping means of the character referred to wherein the ends of the rubber block projecting from the wedge member are formed so as to allow for easy and convenient insertion of the wedge member in a wedge-receiving opening, and such that once the wedge member and rubber block are engaged in said opening, the rubber block grips the walls of said opening and resists withdrawal of the wedge member from engagement in the opening.

Another object of my invention is to provide a gripping means for the purpose referred to which is simple and inexpensive to manufacture, a means which requires no special tool or skill to use, and a means which is highly effective and dependable in operation.

The various objects and features of my invention will be fully understood from the following detailed description of two typical forms and applications of my invention, throughout which description reference is made to the accompanying drawings, in which:

FIG. 1 is an isometric view of a trencher bucket with digger teeth, as provided by the present invention, applied thereto;

FIG. 2 is an enlarged view taken as indicated by line 2—2 on FIG. 1;

FIG. 3 is a view taken as indicated by line 3—3 on FIG. 2;

FIG. 4 is a view showing a portion of the construction shown in FIG. 3 with parts separated;

FIG. 5 is a view similar to FIG. 4 showing the parts partially engaged;

FIG. 6 is a view similar to FIG. 5 showing the parts fully engaged;

FIG. 7 is an isometric view of a power shovel bucket with digger teeth and digger teeth caps as provided by the present invention applied thereto;

FIG. 8 is a view taken as indicated by line 8—8 on FIG. 7; and

FIG. 9 is an exploded isometric view of another form of the digger tooth and digger tooth cap construction that I provide.

In FIGS. 1 through 6 of the drawings I have illustrated a typical removable digger tooth construction T embodying the present invention.

FIG. 1 shows a typical trencher bucket B having a plurality of mounting blocks M fixed to its upper, forward, work-engaging edge 10 and a digger tooth T engaged in and projecting upwardly and forwardly from each block.

The bucket B shown in the drawings is only illustrative of one form of trencher bucket and is intended to show one typical application and use of removable and/or replaceable digger teeth.

The mounting blocks M are simple cast or forged steel blocks, polygonal in cross-section and provided with central longitudinally extending tooth wedge-receiving openings 11. The openings 11 are polygonal in cross-section. The opposite sides or surfaces of the openings diverge longitudinally toward one end of the blocks, hereinafter referred to as the outer ends of the blocks.

The blocks M are, in the case illustrated, arranged with one side thereof in flat bearing engagement on a suitable surface on the bucket B and are fixed thereto as by welding W.

In some special constructions, the openings 11 are provided in integral parts or portions of the equipment with which the teeth are related, or the mounting blocks are provided with special exterior configurations and are provided with special means for securing the blocks to a piece of equipment. For instance, a plurality of openings 11 can be provided in a special frame member or bar on the equipment with which the teeth are to be related, or the mounting blocks can be provided with fastener-receiving mounting flanges, or the like, to facilitate securing the blocks to the piece of equipment.

In light of the above, it will be apparent that the present invention is primarily concerned with the tapered tooth-receiving openings 11, and that the particular mounting blocks M shown and described are only illustrative of one suitable construction in which such openings can be provided.

The several digger teeth T are alike, each including an elongate inner, longitudinally inwardly-converging wedge portion 20 and an elongate longitudinally outwardly-extending, work-engaging portion or plate 21.

The wedge portion 20 of each digger tooth is polygonal in cross-section and is inwardly convergent at an angle so as to cooperatively engage in and establish snug or tight wedging engagement in the tooth-receiving opening 11 in which the tooth is to be related.

In the case illustrated, the openings 11 and wedge portions 20 in the blocks M and on the teeth T have flat, longitudinally inwardly-converging, opposing, inner surfaces 22 and 23, outer surfaces 24 and 25, and side surfaces 26 and 27.

In practice, all of the above-noted parts of surfaces need not be inclined to converge inwardly relative to the longitudinal axis of the construction, it being sufficient that only one of said pairs of surfaces be so disposed that the desired wedging action can be obtained.

Further, in practice, where the axial rotative position of the teeth is not critical, the openings 11 and the wedge portions 20 of the teeth could be round in cross-section without departing from the spirit of this invention.

The blade portion 21 of the teeth T can be of any desired configuration. In the case illustrated, the blade portions are shown as substantially flat, rectangular portions having longitudinally outwardly-divergent side walls 30 and longitudinally outwardly divergent front and rear surfaces 31 and 32.

The inner or base end of the portion 21, where it joins the wedge portion 20, is greater in lateral extent than the wedge portion and defines shoulders 33, which shoulders overlie and shield the adjacent end portions of the mounting blocks M, as clearly illustrated in FIG. 3 of the drawings. The other or outer ends of the portions 21 of the teeth are suitably dressed, as at 34, to establish straight transversely-extending cutting edges 35.

With the construction thus far described, it will be apparent that the wedge portion 20 of each tooth T can be advantageously inserted in the opening 11 in the mounting block M to which the tooth is related, to establish tight wedging engagement therein and that the outer work-engaging portion or blade of the tooth projects from the block in fixed predetermined relationship thereto.

In addition to the foregoing, each tooth T is provided with gripping means G, which means serves to releasably, yieldingly hold and maintain the tooth engaged in the opening 11 in the mounting block M to which it is related.

The gripping means G includes an opening 40 extending transversely through the wedge portion 20 of the tooth, at the inner end portion thereof, recesses 41 in the surfaces of the wedge portion of the tooth in which the openings 40 enter and communicating with the adjacent ends of the opening 40 and extending longitudinally inwardly, toward the blade portion 21 of the tooth and in the direction in which the wedge portion diverges; and an elongate, normally straight rubber bar or block 45 engaged through the opening 40 to normally project from the opposite ends thereof and from the adjacent surfaces of the wedge.

In the case illustrated, the opening 40 extends between the front and rear surfaces 25 and 23 of the wedge portion of the tooth and the recesses 41 occur in said surfaces, as clearly illustrated in the drawings.

In the preferred carrying out of the invention and as illustrated in the drawings, the block 45 is round in cross-section; is of substantially the same cross-section as the opening 40 so that it can be easily and conveniently slid into snug engagement therewith, and has angular end portions, that is, the ends of the blocks are cut obliquely to establish flat angularly disposed ends 46 which serve to lead or direct the block when the wedge is inserted and urged into engagement in the opening 11 in the mounting block M and which establish frictional engagement with the opposing surfaces in the opening 11.

The recesses 41 may be substantially equal but not less in volumetric extent with the volumetric extent of the end portions of the block 45 which project from the wedge portion of the tooth.

When the wedge portion 20 of the tooth is urged into engagement in the mounting block opening 11, the end portions of the block 45 are initially engaged by the outer end of the mounting block, or edge of the opening 11 and yield or bend longitudinally outwardly, as illustrated in FIG. 5 of the drawings. As the said wedge portion is urged further into engagement in the opening 11, the end portions of the block are drawn longitudinally outwardly and flow into the recesses 41 until the wedge is fully engaged in the opening 11 and the end portions of the block are drawn and compacted into the recesses 41 and establish tight yielding, gripping engagement on the walls of the recesses and on the adjacent opposing walls or surfaces of the opening, as clearly illustrated in FIG. 6 of the drawings.

It will be apparent that, as the construction is assembled in the manner set forth above, due to the arrangement and disposition of the recesses 41, the ends of the block are free to be drawn, stressed and to flow. It will be further apparent that once the construction is assembled, as illustrated in FIGS. 3 and 6 of the drawings, the openings 40 and the adjacent inner end portions of the recesses 41 are substantially fully occupied by the mass of rubber comprising the block 45 and that upon reverse shifting of the wedge portion of the tooth in the mounting block, that is, outward shifting of the tooth relative to the mounting block, there is no place for the rubber to flow and by virtue of the frictional engagement on the opposing adjacent walls of the opening 11, the rubber mass is urged and/or dragged back upon itself in such a manner as to enhance or increase the compressive forces thereon and enhance or increase the pressure frictional engagement of the rubber on the adjacent parts of the construction.

From the foregoing, it will be apparent that the gripping means G that I provide serves to yieldingly frictionally hold the tooth and mounting block in tight engagement and is such that the tooth will not, under normal working conditions, work free and become displaced from engagement in the opening 11 in the mounting block M.

The inclined ends 46 on the blocks 45 are disposed in planes which converge inwardly toward the inner end of the wedge portion of the tooth. By so disposing the ends of the blocks, the block freely establishes entry into the outer end of the opening 11, as clearly illustrated in FIG. 4 of the drawings. Further, as the wedge and block are urged further into engagement in the opening 11, the inclined ends of the block serve to direct and feed the end portions thereof into the recesses 40 and serve to so dispose the mass of the rubber going to make up the block so that undesired galling, pinching and/or extrusion of the rubber between the tooth and the walls of the opening 11 in the mounting block, will not occur.

Still further, the flat ends 46 of the block normally establish substantially flat, frictional bearing engagement on the opposing surfaces of the opening 11. Since the ends of the block are angularly related to the longitudinal axis of the block, they establish what may be referred to as enlarged, frictional bearing surfaces, which, when in operating position, materially increase the gripping effect of the block on the surfaces of the opening.

While the means G serves to prevent displacement of the tooth T from engagement in the block M, under normal working conditions, the tooth T can be driven from engagement in the block by means of a suitable punch or the like engaged in the opening 11 from the inner end thereof or, the tooth can be pulled from engagement in the mounting block by means of a suitable prying tool engaged between the shoulders 33 on the tooth and the outer adjacent end of the mounting block.

In FIGS. 7 and 8 of the drawings, I have illustrated a typical removable digger tooth construction A′ embodying my present invention.

FIG. 7 shows a typical power shovel bucket B′ having a plurality of teeth T′ fixed to the lower forward work-engaging edge 10′ of the bucket and a work-engaging, wear-receiving tooth cap engaged on each tooth.

The bucket B′ is only intended to illustrate a typical application and use of digger tooth and digger tooth cap constructions.

The digger teeth T′ are simple unitary cast or forged steel members fixed to their related piece of earth working equipment, as by welding W′, and to project from the said equipment in a predetermined desired relationship.

The outer, forward, free end of each tooth T′ has flat, forwardly-converging top and bottom surfaces 50 and 51 and straight parallel side surfaces 52. The forward portion of the tooth T′, referred to above, establishes what is, in effect, a tooth cap mounting wedge and will hereinafter be referred to as the wedge portion of the tooth.

The digger tooth cap C illustrated in the drawings is a typical or conventional digger tooth cap construction and includes a flat, substantially rectangular plate-like body having flat top and bottom surfaces 53 and 54, straight parallel sides 55, a straight inner end 56 and a suitably dressed or sharpened transversely-extending front edge 57. A suitable housing having a flat bottom wall 58 and vertically disposed side walls 59 with forwardly and downwardly-inclined upper edges 60 is arranged adjacent the bottom surface 53 of the body, at the rear end portion thereof, and is fixed thereto by suitable welding W between the edges 60 of the side walls of the housing and the adjacent edges of the body.

With the relationship of parts set forth above, it will be apparent that the inner surfaces of the bottom and side walls 58 and 59 of the housing and the bottom surface 53 of the body cooperate to define a forwardly converging tooth or wedge-receiving opening or socket 11′.

With the construction set forth above, it will be apparent that the tooth cap C can be advantageously engaged on the wedge portion of the tooth T′ to establish tight wedging engagement thereon and to be carried thereby and that the tooth cap C serves to protect the tooth T′ and to receive the wear to which the construction is subjected.

In this second form of the invention, gripping means G′, similar to the means G in the first form of the invention, is provided. The means G′ includes an opening 40′ in the wedge portion of the tooth, which opening extends between the top and bottom surfaces 50 and 51 at the forward portion of the tooth, recesses 41′ in the surfaces 50 and 51 of the tooth and extending rearwardly from the opening 40′ with which they communicate, and an elongate rubber block 45′ having inclined ends 46 engaged in and through the opening 40′ to normally project from the surfaces 50 and 51. The block 45′, like the block 45, is adapted to be urged into the recesses 41′ when the tooth cap C is urged onto and about the wedge portion of the tooth T′ and establishes tight frictional pressure engagement between the bottoms of the recesses and on the adjacent surfaces of the cap.

In FIG. 9, I have shown a digger tooth and cap construction similar to that construction shown in FIG. 8, like parts and portions being designated by like characters and numerals.

In this third form of the invention, a second gripping means G$^a$ is provided to supplement the means G′. The means G$^a$ is similar to the means G′, but is arranged to extend transversely through the tooth T′, rearward of the means G′.

From the foregoing, it will be apparent that the means G, G′ and G$^a$ are identical in construction and in operation.

Having described my invention, I claim:
plications of my invention, I do not wish to be limited or restricted to the specific details herein set forth, but wish to reserve to myself any modifications and variations that may appear to those skilled in the art and fall within the scope of the following claims.

Having described by invention, I claim:

1. Means for resiliently inhibiting axial movement of an elongate male member engaged in an elongate female member including, an opening extending transversely through the male member, laterally outwardly opening recesses in the male member communicating with the opening and extending longitudinally of the male member from one side of the opening, an elongate rubber block engaged in and projecting from the opposite ends of the opening in the male member, the end portions of the block being engaged by the interior surface of the female member and yieldingly urged longitudinally into the recesses in the male member when said member is shiftted axially into the female member to establish pressure frictional engagement with the interior surface of the female member, the end portions of the block extending from their related ends of the opening and to the terminal ends of the block being angular with flat inclined planes divergent relative to the longitudinal axis of the male member and the direction of travel of the male member into the female member to facilitate engagement of the male member in the female member and to induce substantially uniform predetermined disposition of the end portions of the block relative to the female member.

2. Means for resiliently inhibiting axial movement of an elongate male member engaged in an elongate female member including, an opening extending transversely through the male member, laterally outwardly opening recesses in the male member communicating with the opening and extending longitudinally of the male member from one side of the opening, an elongate rubber block engaged in and projecting from the opposite ends of the opening in the male member, the end portions of the block being adapted to be engaged by the female member and urged longitudinally into the recesses in the male member when the male member is shifted axially into the female member and to establish pressure frictional engagement with the interior of the female member, the volumetric extent of the recesses being at least equal to the volumetric extent of the end portions of the block that project from the male member, the end portions of the block being ungular with flat surfaces extending from the ends of the opening to terminal ends of the block on inclined planes divergent relative to the longitudinal axis of the male member and the direction of travel of the male member into the female member to facilitate engagement of the male member in the female member and to induce predetermined dispositioning of the rubber mass in the recesses and relative to the female member.

3. Means for resiliently holding an elongate forwardly-convergent wedge member in a forwardly-convergent wedge-receiving opening in a supporting structure including, an opening extending transversely through the forward portion of the wedge member, elongate recesses in the wede member communicating with the ends of the opening and extending longitudinally rearwardly therefrom, an elongate rubber block slidably engaged through the opening and having end portions projecting from the opposite sides of the wedge member, said end portions of the block having flat, normally rearwardly and outwardly divergent ends, said end portions adapted to be engaged by the female member and urged rearwardly into the recesses when the wedge is urged into engagement in the wedge-receiving opening whereby said flat ends establish substantially flat pressure-frictional engagement with the adjacent walls of the wedge-receiving opening.

4. Means for resiliently holding an elongate forwardly-convergent wedge member in a forwardly-convergent wedge-receiving opening in a supporting structure including, an opening extending transversely through the forward portion of the wedge member, elongate recesses in the wedge member communicating with the ends of the opening and extending longitudinally rearwardly therefrom, an elongate rubber block slidably engaged through the opening and having end portions projecting from the opposite sides of the wedge member, said end portions of the block having flat, normally rearwardly and outwardly divergent ends, said end portions being engaged by the female member and urged rearwardly into the recesses when the wedge is moved forwardly into engagement in the wedge-receiving opening whereby said flat end establish substantially flat pressure-frictional engagement with the adjacent walls of the wedge-receiving opening, the volumetric extent of the recesses being at least equal to the volumetric extent of the end portions of the block that project from the wedge.

5. Means for resiliently holding an elongate forwardly-convergent wedge member in a forwardly-convergent wedge-receiving opening in a supporting structure including, an opening extending transversely through the forward portion of the wedge member, elongate recesses in the wedge member communicating with the ends of the opening and extending longitudinally rearwardly therefrom, an elongate rubber block slidably engaged through the opening and having end portions projecting from the opposite sides of the wedge member, said end portions of the block being engaged by the female member and urged rearwardly into the recesses when the wedge is moved forwardly into engagement in the wedge-receiving opening and establish yielding pressure-frictional engagement with the adjacent walls of the wedge-receiving opening, the end portions of the block being inclined on planes rearwardly divergent relative to the longitudinal axis of the wedge to facilitate engagement of the wedge and block into the wedge-receiving opening and to dispose the rubber mass for substantially predetermined dispositioning in the recesses and defining tapered, resilient tip ends on the block which engage said wal's and yieldingly resist withdrawal of the member from the opening.

6. Means for resiliently holding an elongate forwardly-convergent wedge member in a forwardly-convergent wedge-receiving opening in a supporting structure including, an opening extending transversely through the forward portion of the wedge member, elongate recesses in the wedge member communicating with the ends of the opening and extending longitudinally rearwardly therefrom, an elongate rubber block slidably engaged through the opening and having end portions projecting from the opposite sides of the wedge member, said end portions of the block being engaged by the female member and urged rearwardly into the recesses when the wedge is moved forwardly into engagement in the wedge-receiving opening and establish pressure-frictional engagement with the adjacent walls of the wedge-receiving opening, the volumetric extent of the recesses being at least equal to the volumetric extent of the end portions of the block that project from the wedge, the end portions of the block being inclined on planes rearwardly divergent relative to the longitudinal axis of the wedge to facilitate engagement of the wedge and block into the wedge-receiving opening and to induce substantially uniform predetermined deflection and dispositioning of the said end portions relative to said adjacent walls and defining tapered resilient tip ends on the block which engage said walls and yieldingly resist withdrawal of the member from the opening.

7. A digger tooth construction including, an elongate mounting block having inner and outer ends fixed to a piece of earth moving equipment and having a longitudinally outwardly divergent polygonal wedge-receiving opening, an elongate digger tooth having an outer work-engaging blade portion and an outwardly divergent polygonal inner mounting wedge portion engaged in the wedge-receiving opening and means carried by the wedge portion to yieldingly grip the mounting block and to maintain the tooth and block in assembled relationship, said means including an opening extending transversely through the wedge portion, a recess in the wedge portion at each end of the opening therein to communicate with and extend longitudinally outwardly therefrom with flat end surfaces inclined on planes outwardly divergent relative to the longitudinal axis of the wedge portion engaged in the opening and defining tapered tip end portions projecting laterally outwardly from the opposite sides of the wedge, said tip end portions being engaged by the walls of the wedge receiving opening and displaced longitudinally outwardly into the recesses when the wedge member is engaged and moved longitudinally inwardly into the wedge-receiving opening with said flat end surfaces establishing pressure frictional gripping engagement on the adjacent walls of the wedge-receiving opening.

8. A digger tooth construction including an elongate digger tooth fixed to a piece of earth moving equipment and having a forwardly-convergent wedge to enter and support a digger tooth cap, a digger tooth cap having a rearwardly-opening forwardly-convergent tooth wedge-receiving opening engaged on the tooth wedge in tight wedging relationship, and gripping means releasably retaining the cap engaged on the tooth wedge including, a transverse opening extending through the tooth wedge, recesses in the tooth wedge communicating with the ends of the opening and extending longitudinally rearwardly therefrom, an elongate rubber block slidably engaged in the opening and having flat end surfaces inclined on planes rearwardly divergent relative to the longitudinal axis of the tooth and defining tapered end portions which normally project laterally outwardly from said wedge, said end portions of the block being engaged by adjacent surfaces of the wedge receiving opening and deflected axially rearwardly into the recesses with said flat end surfaces establishing pressure frictional engagement with adjacent opposing surfaces in the wedge receiving opening.

References Cited

UNITED STATES PATENTS

| | | | |
|---|---|---|---|
| 2,319,464 | 5/1943 | Massa | 37—142 |
| 2,852,874 | 9/1958 | Grubb | 37—142 |
| 2,968,880 | 1/1961 | Peterson | 37—142 |
| 2,971,280 | 2/1961 | Smedley | 37—142 |

ABRAHAM C. STONE, *Primary Examiner.*

A. E. KOPECKI, *Assistant Examiner.*